Dec. 22, 1959   J. POHR   2,917,826
CUTTER AND TRIMMER BLADE
Filed Nov. 27, 1957   2 Sheets-Sheet 1
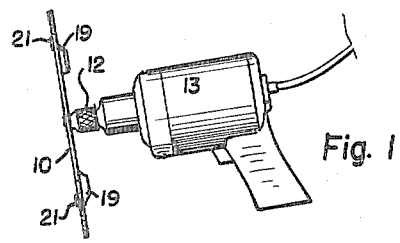
Fig. 1
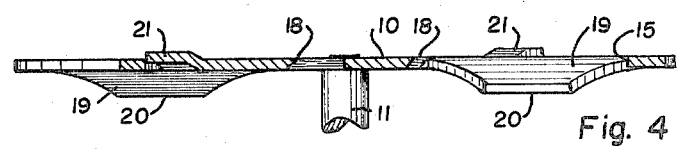
Fig. 4
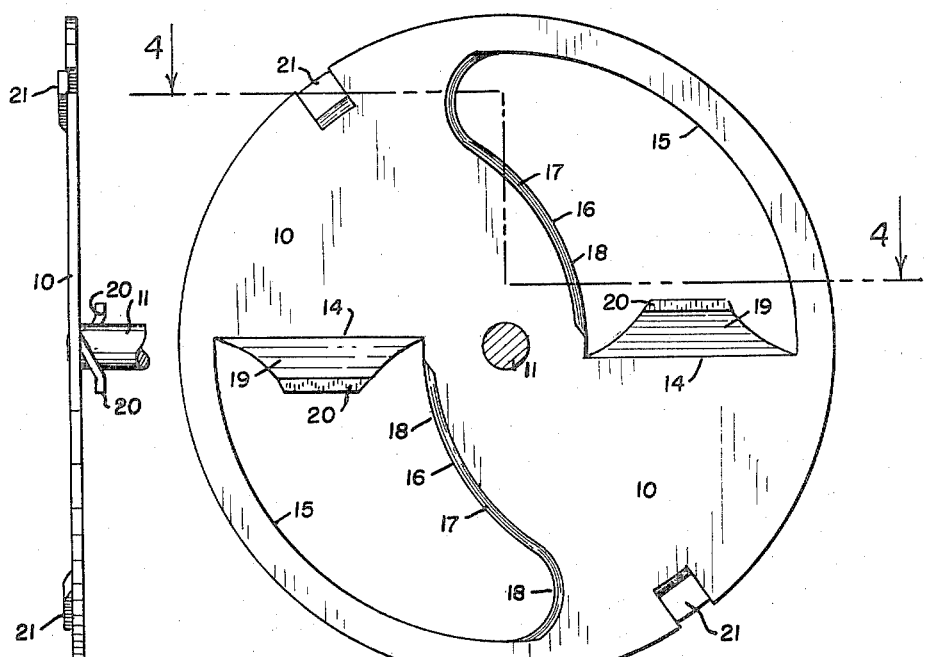
Fig. 3
Fig. 2
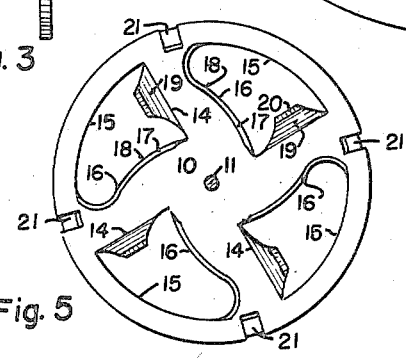
Fig. 5
INVENTOR.
JACK POHR
BY
ATTORNEY Dec. 22, 1959  J. POHR  2,917,826
CUTTER AND TRIMMER BLADE
Filed Nov. 27, 1957  2 Sheets-Sheet 2

INVENTOR.
JACK POHR
BY
ATTORNEY

United States Patent Office 2,917,826
Patented Dec. 22, 1959

2,917,826

CUTTER AND TRIMMER BLADE

Jack Pohr, Denver, Colo.

Application November 27, 1957, Serial No. 699,324

5 Claims. (Cl. 30—347)

This invention relates to trimmer and cutter means conveniently power-operable to clip and even plant growth, as in the edging of lawns, the shaping of hedges and shrubbery, and the like, and has as an object to provide a novel revoluble blade unit efficiently operable in association with conventional driving means to accomplish such purposes with facility and advantage.

A further object of the invention is to provide a novel and improved trimmer and cutter blade unit adapted for operative, powered association with conventional facilities of wide distribution and availability.

A further object of the invention is to provide a novel and improved trimmer and cutter blade revoluble about its central axis to the generation of high shearing efficiency with respect to plant growth engaged thereby.

A further object of the invention is to provide a novel and improved trimmer and cutter blade efficiently and conveniently applicable to the edging of lawns closely adjacent masonry lawn boundaries and interruptions, such as walks, curbs, gutters, and the like.

A further object of the invention is to provide a novel and improved trimmer and cutter blade adapted for expedient economical production from commonly available materials through the agency of known techniques and facilities.

A further object of the invention is to provide a novel and improved trimmer and cutter blade susceptible of production in any expedient range of sizes and in a variety of particular element arrangements.

A further object of the invention is to provide a novel and improved trimmer and cutter blade that is characterized by a long life of practical use and facility of rehabilitation for continued use.

A further object of the invention is to provide a novel and improved construction and operative correlation of elements constituting a trimmer and cutter blade of the type and for the purposes described.

With the foregoing and other objects in view, my invention consists in the construction, arrangement, and operative combination of elements as hereinafter set forth, pointed out in my claims, and illustrated by the accompany drawings, in which—

Figure 1 is a side elevation of a typical embodiment of the invention as mounted in association with powering means ready for practical use.

Figure 2 is a top plan view, on a relatively enlarged scale, of the blade shown in the preceding view detached from the powering unit.

Figure 3 is a side elevation of the blade according to Figure 2.

Figure 4 is a two-plane section through the blade according to Figure 2 taken substantially on the indicated line 4—4 of the latter.

Figure 5 is a top plan view similar to Figure 2 illustrating on a relatively reduced scale a modified construction typical of variations within the contemplation of the invention.

Figure 8:
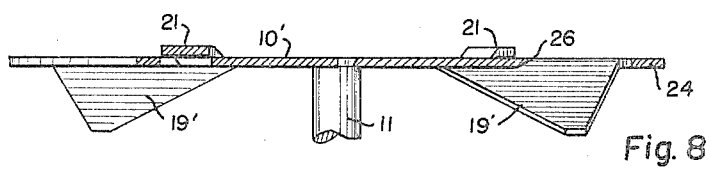
Figure 8 is a two-plane section through the blade according to Figure 6 taken substantially on the indicated line 8—8 of the latter.
Figures 6, 7:
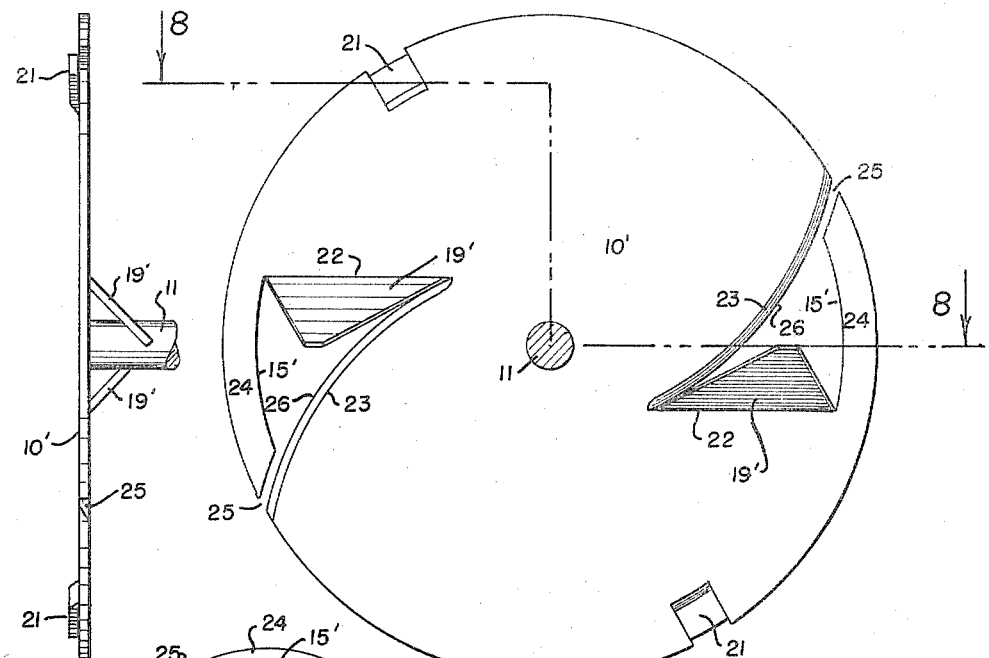
Figure 6 is a top plan view similar to Figure 2 of an alternative organization of the improvement within the contemplation of the invention.
Figure 7 is a side elevation of the blade according to Figure 6.

The factors peculiar to and inconveniently characterizing the edging and trimming of lawns, the clipping of grass from confined and restricted areas, the shaping of shrubbery, and like operations incident to control of plant growth, are so prevalent and well understood as to preclude occasion for elaboration herein. Despite the development and distribution of many devices applicable to the purposes just noted, no tool adequately appropriate to meet the requirements peculiar to the care of lawns, gardens and plots by the individual homeowner is known to be available. Recent expansion in the distribution and use of small powered tools, such as, particularly, portable electric hand drill units, has resulted in an extensive availability of portable electric power units. Corrective of the tool deficiencies above noted through an utilization of the power units commonly available, the instant invention hence is directed to the provision of a novel and efficient cutter and trimmer blade adapted for convenient association with the typical powering units known to be commonly at hand.

Exemplifying and giving effect to the principles of the instant invention, the improved blade as represented by Figures 1–5, inclusive, is constituted as a thin, flat, circular plate 10 of any appropriate hard, rigid material capable of retaining a cutting edge, such as steel, in a size appropriate for association with and powered rotation by a conventional power tool unit of known capacity. A cylindrical stem 11 is fixed centrally of the plate 10 to extend perpendicularly from one face thereof in a diametric size and length appropriate for clampable coaction in and with the usual tool chuck 12 of a portable electric power unit 13, such as a conventional electric drill tool, in such manner as to mount the plate 10 on and in operative relation with the tool 13 for rotation by the latter in a plane perpendicular to the axis of the stem 11 and power output shaft wherewith the latter is coaxially alined.

The plate 10 is conditioned to function as a cutter and trimmer when power rotated about the axis of its stem 11 through the provision of a plurality of large-area apertures intersecting the plane of the plate in a symmetrical, angularly-spaced arrangement. In any expedient preferred number, the apertures opening through the plate 10 are alike in a correlation with the plate such as to present an end margin 14 of each aperture leading in the direction of plate rotation which is substantially radial of the plate in a length considerably exceeding the half radius thereof, an arcuate outer margin 15 inwardly parallelling the adjacent periphery of the plate 10 and trailing in the direction of plate rotation from the outer end of the margin 14 through an arc of substantial magnitude to merge at its trailing end in and with a sinuous, recurved margin 16 which closes to the inner end of the margin 14. It is a feature of the invention that the margin 16 characterizing each aperture through the plate 10 is similarly contoured to present a relatively-long convex aspect trailing the junction of the margins 14 and 16 and a relatively shorter concave aspect joining the outer end of the convex margin portion with the trailing end of the aperture margin 15, thus to apply the aperture margin 16 with slicing action against material intruding through the associated aperture as the plate 10 is rotated to advance the aperture margin 14 in leading relation with its aperture. The aperture margins 16 are the actual cutting elements of the improvement and are conditioned for their intended cutting action by means of bevels 17 formed through the plate thickness and extending approximately the full length of the so-modified margin 16 to provide a sharp cutting lip 18 coplanar with the face of the plate 10 remote from the stem 11 disposed and adapted for severing engagement with material thereby encountered as an incident of plate rotation. As will be apparent, the location and arrangement of the bevels 17 of the cutting lips 18 is such as to facilitate rehabilitation of the sharp lips 18 when and as the latter become dull or damaged.

A further feature of the invention is the provision of deflectors fixedly carried by and for rotation with the plate 10 in an arrangement effective to divert away from the tool operator the clippings separated by the operating plate 10 and to promote induction of the material to be sheared into the path of the cutting lips 18 of the rotating plate. For efficient attainment of their intended functions, the deflectors are constituted as integral webs 19 extending along the aperture margins 14 in a similar offset relation with the plate 10. Each web 19 desirably extends the full length of its aperture margin 14, convergently tapers thence in trailing relation in the direction of plate rotation to a relatively shorter terminal end 20 parallel to said margin 14, and divergently inclines from its junction with the plate at its margin 14 on the same side of the plate as the stem 11 to disposition of its free terminal end 20 in a plane parallel to and spaced from that of the adjacent face of said plate, so that, as the plate 10 is rotated to advance the webs 19 in leading and partially overhanging relation with the associated aperture, the said webs function as deflectors to induce delivery of clippings radially, rather than axially, of the associated plate and also develop a suction effect operable to stimulate engagement of the material to be clipped within the apertures successively rotated thereover.

As is clearly represented by the drawings, the number of apertures with their respective cutting lips and deflectors comprised in a given plate 10 may be varied from a minimum of two, as shown in Figure 2, to a maximum limited only by the consequent effectiveness of the blade; the representation of the Figure 5 disclosing an organization characterized by four such apertures with their associated features and elements. Naturally, the minimum number of apertures according to Figure 2 accommodates maximum area of aperture opening through the plate 10, with consequent maximum operative effectiveness of the blade when rotated at high speed, increase in the number of such apertures necessarily considerably reducing the open area of each aperture and shortening the length of the cutting lip 18 associated with each aperture in a manner and to a degree perhaps adversely affecting the operative efficiency of the blade.

Constructed and organized as shown and as thus far described, the improved blade is operable when associated with a powering unit 13 as represented by Figure 1 in an obvious manner to trim plant growth. Rotated about the axis of its stem 11 by means of the associated tool, the blade is presented to the material to be trimmed with the plane of the rotating plate 12 disposed to establish the desired finished plane of the trimming operation and is then moved along and over the material to be trimmed through shift of the tool 13 with consequent severing of the material engaged by the outer face of the plate as such material enters the plate apertures where it is subject to the action of the cutting edges 18.

One important practical application of the improved blade as mounted and powered for operation being to the trimming of lawn edges along walks, curbs, gutters, and analogous masonry installations, in which operation the blade is frequently disposed as substantially shown in Figure 1 with a lower arc of the blade in contact with the soil adjacent the masonry installation, it is expedient to condition the blade periphery for slight trenching of the soil so engaged for development of clearance wherein the blade may operate without adverse binding or abrading frictions. Such conditioning of the blade periphery feasibly results from a slight thickening of the plate margin by means of integral offsets 21 displaced from the plane of the plate 10 and to the side thereof remote from the stem 11 in a symmetrical spacing circumferentially of the plate. The offsets 21 are preferably of a relative slight extent chordally of the plate 10, as shown, and may be separated from the body of the plate by means of slits substantially radial and opening through the periphery of said plate, although any alternative specific construction of the offsets capable of equivalent action is well within the contemplation of the invention. The offsets 21 need be of little extension radially of the plate, since their purpose is accomplished as a consequence of the thickened plate margin thereby established, and said offsets operate in an obvious manner upon rotation of the blade in engagement with the soil to open and excavate a trench in the soil of a width wherein rotation of the plate margin may be freely accommodated.

Figure 9:
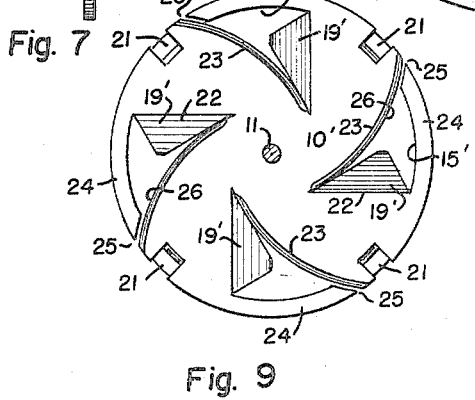
Figure 9 is a top plan view similar to Figure 6 illustrating on a relatively reduced scale a further modified construction typifying variations within the contemplation of the invention.

In the alternative embodiment of the invention represented by Figures 6–9, inclusive, the operative elements of the blade are developed from and correlated with a thin, flat, circular plate 10' the same as or analogous to the plate 10 wherewith are associated the stem 11 and offsets 21 in the manner, relationship, and for the purposes hereinabove described. The alternative embodiment of the invention differs from that first described only with respect to the size of the apertures utilized, their shape and correlation with the plate, and the deflector and cutting edge arrangements associated therewith. In the blade organization according to Figures 6–9, inclusive, the apertures provided in intersecting relation with the plate 10' are, in any desired appropriate number, reduced somewhat in size relative to those preferred for the plate 10, are generally triangular in plan, and, in a symmetrical spacing angularly of the plate, are alike defined by a straight margin 22 disposed chordally, rather than radially, of the plate at the aperture end leading in the direction of plate rotation, an arcuate outer margin 15' inwardly paralleling the periphery of the plate, and a convexly arcuate margin 23 uniformly receding in the direction of plate rotation from a junction with the inner end of the margin 22 to intersection with the plate periphery in spaced, trailing relation with the consequently-free end of the arcuate plate strip 24 embraced between the aperture margin 15' and the segment of the plate periphery opposed thereto. Extension of the aperture margin 23 through the plate periphery in a spacing from the free end of the associated plate strip 24 provides a slot, or gap, 25 therebetween which is of operative advantage, particularly when the blade is working in wet growth, to clear cuttings from the blade and to enhance the cutting effect thereof. The convex aperture margin 23 is appropriately beveled throughout its length to provide a sharp cutting edge 26 coplanar with the surface of the plate 10' remote from the stem 11 and trailing in the direction of plate rotation for slicing reaction upon plant material intruding through the associated aperture. The deflectors 19' distinguishing the embodiment of the invention represented by Figures 6–9, inclusive, are the functional equivalents of the elements 19 of the organization first described and differ from the latter as to structural particularity in that the deflectors 19' are planar at an inclination from the margins 22 of their respective apertures at the same side of the plate as the stem 11 and trailing in the direction of plate rotation and are of an extent so registered with the associated aperture as to overhang and protectively cover a substantial portion of the associated aperture area proportionally much greater than that similarly overhung by the elements 19 of the embodiment first described. Manifestly, the improvement as organized according to Figures 6-9, inclusive, operates under power rotation about its axis to cut and trim in the manner previously set forth, and, in some respects, with enhanced efficiency and advantage, the number and arrangement of apertures and associated elements characterizing the alternative embodiment being susceptible of variation as indicated by the showing of Figure 9.

Since changes, variations, and modifications in the form, construction, and arrangement of the elements shown and described may be had without departing from the spirit of my invention, I wish it to be understood as being limited solely by the scope of the appended claims, rather than by any details of the illustrative showing and foregoing description.

I claim as my invention:

1. A cutter and trimmer blade for operative association with a portable power tool, comprising a thin, flat, rigid, circular plate adapted for rotation about its center formed with like, generally-triangular apertures uniformly spaced apart angularly thereof, each of which apertures is bounded by and defined within margins whereof one is straight substantially chordal of the plate at the end of the aperture leading in the direction of plate rotation, a second adjacently parallels the plate periphery and trails in the direction of plate rotation from the outward end of the straight margin, and the third is convexly curved in connecting relation substantially chordally of the plate between the inward end of said straight margin and the end of the margin paralleling the plate periphery remote from said straight margin, a stem connectible in coaxial, driven relation with the power shaft of a portable tool fixed centrally to and extending perpendicularly from said plate, and a beveled edge on each said convexly curved aperture margin inclined to intersect the surface plane of said plate opposite to that engaged by said stem at an acute angle productive of a sharpened cutter lying in the plate surface plane so intersected.

2. A cutter and trimmer blade for operative association with a portable power tool, comprising a thin, flat, rigid, circular plate adapted for rotation about its center formed with like, generally-triangular apertures uniformly spaced apart angularly thereof, each of which apertures is bounded by and defined within margins whereof one is straight substantially chordal of the plate at the end of the aperture leading in the direction of plate rotation, a second adjacently parallels the plate periphery and trails in the direction of plate rotation from the outward end of the straight margin, and the third is convexly curved in a disposition substantially chordal of the plate extending from the inward end of said straight margin past the end of the margin paralleling the plate periphery remote from said straight margin and through said plate periphery as one side of a slot passage leading from the aperture outwardly of the plate in trailing divergence from the orbit of aperture rotation with the plate, a stem connectible in coaxial, driven relation with the power shaft of a portable tool fixed centrally to and extending perpendicularly from said plate, and a beveled edge on and length coextensive to the plate periphery with each said convexly curved aperture margin inclined to intersect the surface plate of said plate opposite to that engaged by said stem at an acute angle productive of a sharpened cutter lying in the plate surface plane so intersected.

3. A cutter and trimmer blade for operative association with a portable power tool, comprising a thin, flat, rigid, circular plate adapted for rotation about its center formed with like, generally-triangular apertures uniformly spaced apart angularly thereof, each of which apertures is bounded by and defined within margins whereof one is straight substantially chordal of the plate at the end of the aperture leading in the direction of plate rotation, a second adjacently parallels the plate periphery and trails in the direction of plate rotation from the outward end of the straight margin, and the third is convexly curved in connecting relation substantially chordally of the plate between the inward end of said straight margin and the end of the margin paralleling the plate periphery remote from said straight margin, a stem connectible in coaxial, driven relation with the power shaft of a portable tool fixed centrally to and extending perpendicularly from said plate, deflector webs offset from the plane of said plate at the same side as said stem to partially overhang said apertures from and in trailing relation with the aperture straight end margins leading in the direction of plate rotation, and a beveled edge on each said convexly curved aperture margin inclined to intersect the surface plane of said plate opposite to that engaged by said stem at an acute angle productive of a sharpened cutter lying in the plate surface plane so intersected.

4. A cutter and trimmer blade for operative association with a portable power tool, comprising a thin, flat, rigid, circular plate adapted for rotation about its center formed with like, generally-triangular apertures uniformly spaced apart angularly thereof, each of which apertures is bounded by and defined within margins whereof one is straight substantially chordal of the plate at the end of the aperture leading in the direction of plate rotation, a second adjacently parallels the plate periphery and trails in the direction of plate rotation from the outward end of the straight margin, and the third is convexly curved in connecting relation substantially chordally of the plate between the inward end of the straight margin and the end of the margin paralleling the plate periphery remote from the straight margin, a stem connectible in coaxial, driven relation with the power shaft of a portable tool fixed centrally to and extending perpendicularly from said plate, integral offsets from the plane of said plate through the plate surface remote from said stem interrupting and thickening the otherwise smoothly blunt plate periphery, and a beveled edge on each said convexly curved aperture margin inclined to intersect the surface plane of said plate opposite to that engaged by said stem at an acute angle productive of a sharpened cutter lying in the plate surface plane so intersected.

5. A cutter and trimmer blade for operative association with a portable power tool, comprising a thin, flat, rigid, circular plate adapted for rotation about its center formed with like, generally-triangular apertures uniformly spaced apart angularly thereof, each of which apertures is bounded by and defined within margins whereof one is straight substantially chordal of the plate at the end of the aperture leading in the direction of plate rotation, a second adjacently parallels the plate periphery and trails in the direction of plate rotation from the outward end of the straight margin, and the third is convexly curved in a disposition substantially chordal of the plate extending from the inward end of said straight margin past the end of the margin paralleling the plate periphery remote from said straight margin and through said plate periphery as one side of a slot passage leading from the aperture outwardly of the plate in trailing divergence from the orbit of aperture rotation with the plate, a stem connectible in coaxial, driven relation with the power shaft of a portable tool fixed centrally to and extending perpendicularly from said plate, deflector webs offset from the plane of said plate at the same side as said stem to partially overhang said apertures from and in trailing relation with the aperture straight end margins leading in the direction of plate rotation, integral offsets from the plane of said plate through the plate surface remote from said stem interrupting and thickening the otherwise smoothly blunt plate periphery, and a beveled edge on and length coextensive to the plate periphery with each said convexly curved aperture margin inclined to intersect the surface plane of said plate opposite to that engaged by said stem at an acute angle productive of a sharpened cutter lying in the plate surface plane so intersected.

References Cited in the file of this patent

UNITED STATES PATENTS

| | | | |
|---|---|---|---|
| 716,696 | Foster | Dec. 23, | 1902 |
| 966,701 | Palmer | Aug. 9, | 1910 |
| 1,186,880 | Canda | June 13, | 1916 |
| 1,336,257 | Muzzy | Apr. 6, | 1920 |
| 2,583,113 | Mogel | Jan. 22, | 1952 |
| 2,599,843 | Knutzen | June 10, | 1952 |
| 2,663,986 | Gransden | Dec. 29, | 1953 |
| 2,685,832 | Rianda | Aug. 10, | 1954 |
| 2,737,105 | Wilson | Mar. 6, | 1956 |